(12) United States Patent
Liu

(10) Patent No.: US 8,914,996 B2
(45) Date of Patent: Dec. 23, 2014

(54) ANTISTATIC INSOLE

(75) Inventor: Keh-Tao Liu, Taipei (TW)

(73) Assignee: Global Action Inc., Taipei (TW)

( * ) Notice: Subject to any disclaimer, the term of this patent is extended or adjusted under 35 U.S.C. 154(b) by 391 days.

(21) Appl. No.: 13/369,519

(22) Filed: Feb. 9, 2012

(65) Prior Publication Data
US 2012/0204444 A1 Aug. 16, 2012

(30) Foreign Application Priority Data

Feb. 14, 2011 (TW) ............................... 100202720 U

(51) Int. Cl.
| | | |
|---|---|---|
| A43B 17/00 | (2006.01) |
| B32B 27/06 | (2006.01) |
| A43B 13/04 | (2006.01) |
| B32B 3/26 | (2006.01) |
| A43B 13/10 | (2006.01) |
| B32B 5/18 | (2006.01) |
| A43B 1/00 | (2006.01) |
| A43B 13/02 | (2006.01) |
| A43B 7/14 | (2006.01) |
| B32B 25/04 | (2006.01) |
| A43B 7/36 | (2006.01) |
| B32B 5/24 | (2006.01) |
| B32B 3/08 | (2006.01) |
| B32B 27/30 | (2006.01) |

(52) U.S. Cl.
CPC ............... *A43B 7/148* (2013.01); *B32B 27/065* (2013.01); *A43B 13/04* (2013.01); *B32B 2307/202* (2013.01); *B32B 3/263* (2013.01); *B32B 2270/00* (2013.01); *A43B 13/10* (2013.01); *B32B 2266/0278* (2013.01); *B32B 5/18* (2013.01); *B32B 2307/724* (2013.01); *B32B 2262/106* (2013.01); *A43B 1/0045* (2013.01); *A43B 13/026* (2013.01); *A43B 7/141* (2013.01); *B32B 25/045* (2013.01); *B32B 2307/728* (2013.01); *A43B 7/144* (2013.01); *B32B 2307/7145* (2013.01); *A43B 7/36* (2013.01); *B32B 5/245* (2013.01); *B32B 2437/02* (2013.01); *B32B 3/08* (2013.01); *B32B 2262/103* (2013.01); *A43B 7/142* (2013.01); *B32B 27/306* (2013.01); *B32B 3/266* (2013.01); *B32B 2307/21* (2013.01)
USPC .................................................. 36/44; 36/140

(58) Field of Classification Search
USPC ........... 36/43, 44, 91, 92, 140, 145, 166, 173, 36/181
See application file for complete search history.

(56) References Cited

U.S. PATENT DOCUMENTS

| 4,926,570 | A | * | 5/1990 | Fohst ................................. 36/43 |
| 5,146,698 | A | * | 9/1992 | Tilles et al. ....................... 36/44 |

(Continued)

*Primary Examiner* — Marie Bays
(74) *Attorney, Agent, or Firm* — C. G. Mersereau; Nikolai & Mersereau, P.A.

(57) ABSTRACT

An antistatic insole is disclosed, which consists of one cover layer, one first layer body, one second layer body, one arch pad, and one heel pad. The insole is assembled with a cover layer on the surface of the first layer body and the second layer body below the first layer body and the heel pad and the arch pad are below the second layer body. The elasticity of the heel pad is more elastic and the arch pad less elastic than the first layer body. The contour of the surface of the first layer body follows that of the foot arch of a human body and acts coherently with that of the second layer body. The cover layer, the first layer body, and the second layer body are antistatic. The arch pad is equipped with antistatic and anti-fatigue functions according to various arch shapes of a human foot.

10 Claims, 8 Drawing Sheets

(56) References Cited

U.S. PATENT DOCUMENTS

| | | | |
|---|---|---|---|
| 5,319,867 A * | 6/1994 | Weber | 36/44 |
| 5,994,245 A * | 11/1999 | Marier et al. | 442/373 |
| 7,484,319 B2 * | 2/2009 | Cheskin et al. | 36/44 |
| 7,665,169 B2 * | 2/2010 | Cheskin et al. | 12/146 B |
| 8,479,413 B2 * | 7/2013 | Avent et al. | 36/44 |
| 2004/0181971 A1 * | 9/2004 | Turkbas et al. | 36/44 |
| 2009/0049712 A1 * | 2/2009 | Steszyn et al. | 36/91 |

* cited by examiner

ANTISTATIC INSOLE

FIELD OF THE INVENTION

The present invention relates to an antistatic insole, and in particular to a shoe insole with a heel pad discharging the static electricity in order to achieve anti-fatigue and other functions.

BACKGROUND OF THE INVENTION

With the fast development of modern technology, One of the reasons why various industrial products need to be produced in the environment under highly-restricted regulations is that electrostatic charges often come up with different operating environments. If the charges are accumulated to a hazardous level, electrostatic discharge may lower the quality of the products and even cause related industrial hazards, such as an electric shock hazard.

Therefore, different kinds of antistatic equipments and devices were invented and became essential products of modern precision industrial plants, and antistatic shoes are one of them.

The purposes of some previous cases of antistatic shoes and insoles are mainly focused on the antistatic function instead of the comfort feeling for workers which is commonly missing for regular antistatic shoes and insoles. For staff wearing antistatic shoes with a long period, the fatigue and stress on foot are serious problems. Wearing non-well-designed or non-ergonomic shoes and/or insoles may cause pain on heel, leg and back.

However, in order to solve the problems mentioned above, the inventor has practiced many inventions and experiments based on the experiences and revealed an antistatic insole so as to maintain the advantages and improve the weak points.

SUMMARY OF THE INVENTION

An objective of the present invention is to provide an antistatic insole, which can easily discharge static electricity to said antistatic insole, and then to the ground for lowering the chances of electrostatic hazards.

Another objective of the present invention is to provide an antistatic insole, which can be applied by the users who have already had antistatic shoes to relieve the fatigue and stress on the foot after a long walking period without purchasing another new pair of ergonomic antistatic shoes.

A further objective of the present invention is to provide an antistatic insole, which is an anti-fatigue insole with the shock-absorption and reaction-force-reducing while walking and standing in order to relieve the stress of heel and foot which may cause injuries of bones of lower limbs or muscles.

The other objective of the present invention is to provide an antistatic insole, which is provided with a layer various with designed permeable sizes or spaces of holes in order to attain an antistatic insole with particular mechanical properties which indicate hardness, stiffness and permeability of said insole.

In order to achieve the foregoing objectives of the invention, the present invention is to provide an antistatic insole, which consists of one cover layer, one first layer body, one second layer body, one arch pad and one heel pad. The cover layer is installed on the surface of said first layer body. The second layer body is installed on the bottom of said first layer body. The heel pad and the arch pad are installed on the bottom of said second layer body. The elasticity of said heel pad is greater than that of said first layer body and the stiffness of said arch pad is greater than that of said first layer body. The first layer body follows the contour of the foot arch of human body. The contour of the surface of said first layer body acts coherently with that of said second layer body. Said cover layer, said first layer body, and said second layer body are antistatic.

The antistatic insole corresponds to the biomechanical properties of the forefoot area, the arch area, and the heel area of human foot. The arch pad is installed on the second layer body corresponding to the arch area. It provides different stiffness distributions according to various types of foot arch to reach the anti-fatigue and antistatic functions.

The arch pad corresponding with the contour of human foot is followed by the data of experimental analysis, which statistically collects the data of the contour of human foot and designs the contour of said arch pad as different contours.

The cover layer is made of an antibacterial conductive fabric with capillary phenomenon, which not only shows the antibacterial conductive function, but also has the characteristics of high abrasion, high softness, high sweat-absorbency, high breathability, elimination of odors, and good touching on foot. Said cover layer consists of at least one of the materials as the following: carbon fiber, nickel coated graphite fiber, metal fiber, and intrinsic conductive polymer.

The first layer body is the high density foam made of polyurethane (PU) with good conductivity. Said first layer body has to correspond to the contour of the second layer body and to be combined with said second layer body closely in order to provide better support and comfort.

The second layer body is made of rubber and conductive ethylene-vinyl acetate (EVA) copolymer. It includes second A layer body on forefoot area and second B layer body locating on both arch area and heel area. Said second A layer body is made of conductive EVA while said second B layer body is not and they are mechanically combined as said second layer body.

The heel pad whose material is urethane in high density foam is set up in the heel area for the purpose of providing heel area a proper ability of shock absorption and relieving the fatigue after a long walk or prolong standing.

Comparing to the known techniques, this invention provides an ergonomic antistatic insole to solve the problems of discomfort and fatigues due to non-ergonomic design of antistatic shoes and insoles or designs which did not take the diversity of various contours into consideration of foot arch. Consequently, antistatic insole which consists of conductive first layer body, second layer body, arch pad, and heel pad, reaches the antistatic and anti-fatigue results.

In order to let operators who are familiarized with relevant techniques understand the goals, characteristics, and functions of this invention, the following practical examples are revealed with the figures to illustrate more specifically. However, the revealed practical examples and figures are for reference only, not for further limitation to this invention.

DETAILED DESCRIPTION OF THE INVENTION

Figure 1:
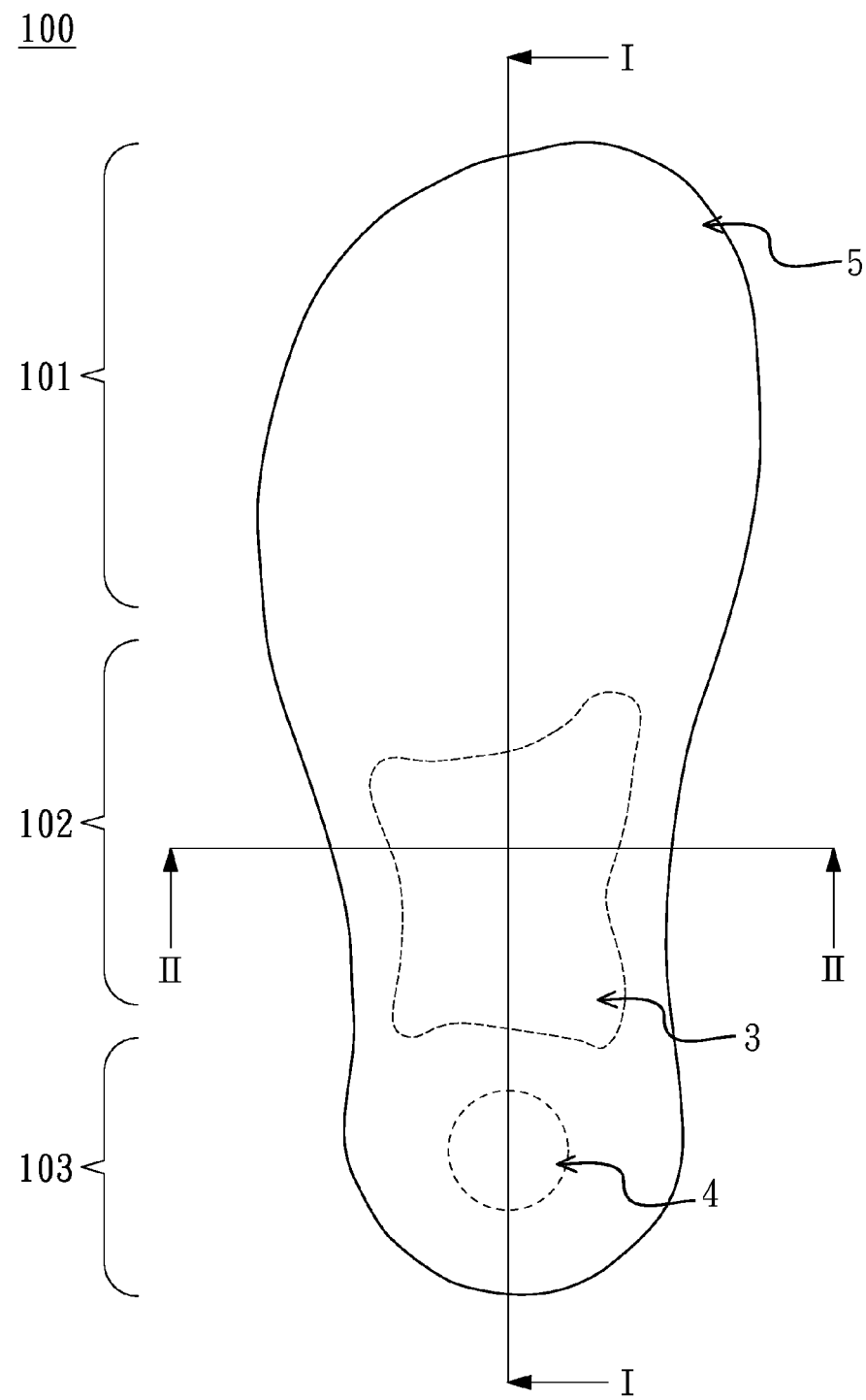
FIG. 1 is a top view of the embodiment practicing example of the antistatic insole.
Figure 2:
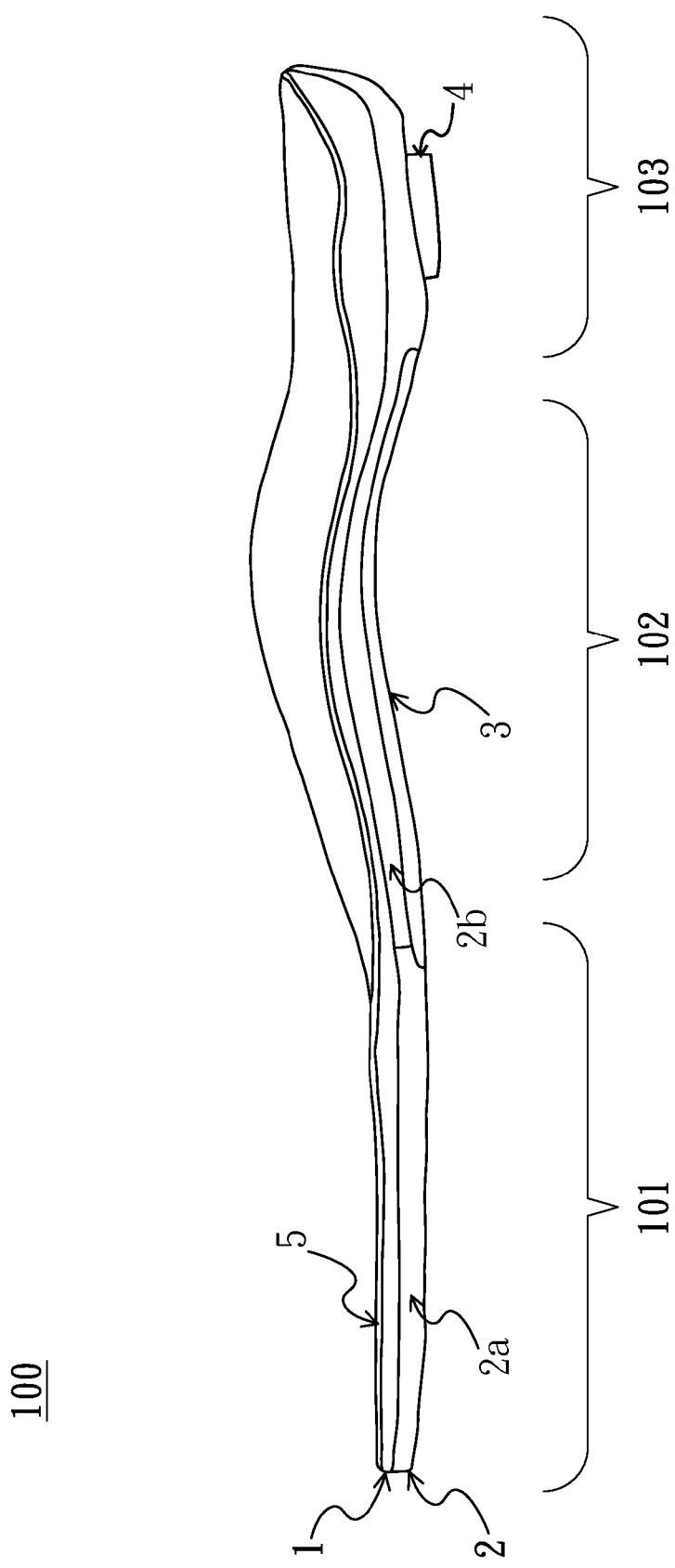
FIG. 2 is a profile view of I-I section of the FIG. 1.
Figure 3:
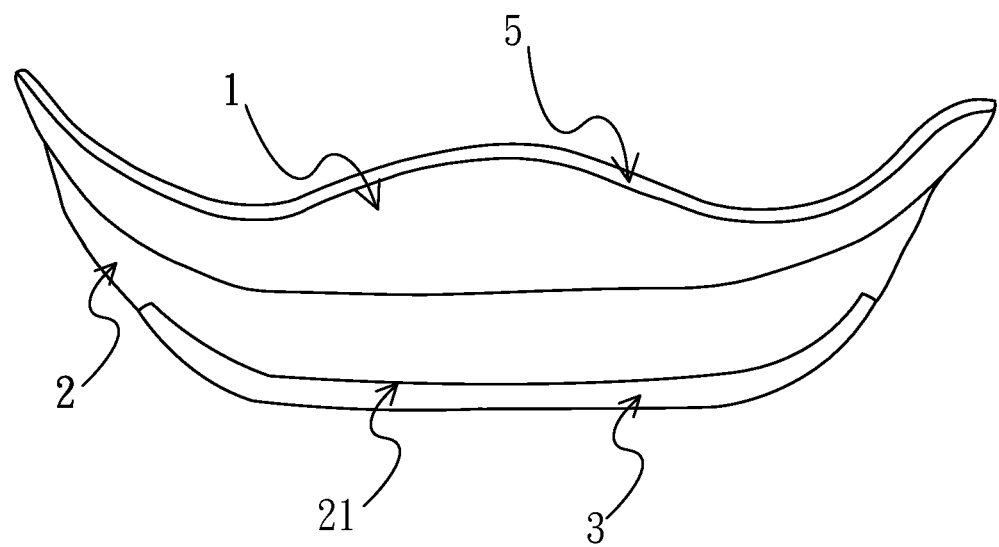
FIG. 3 is a profile view of II-II section of the FIG. 1.
Figure 4:
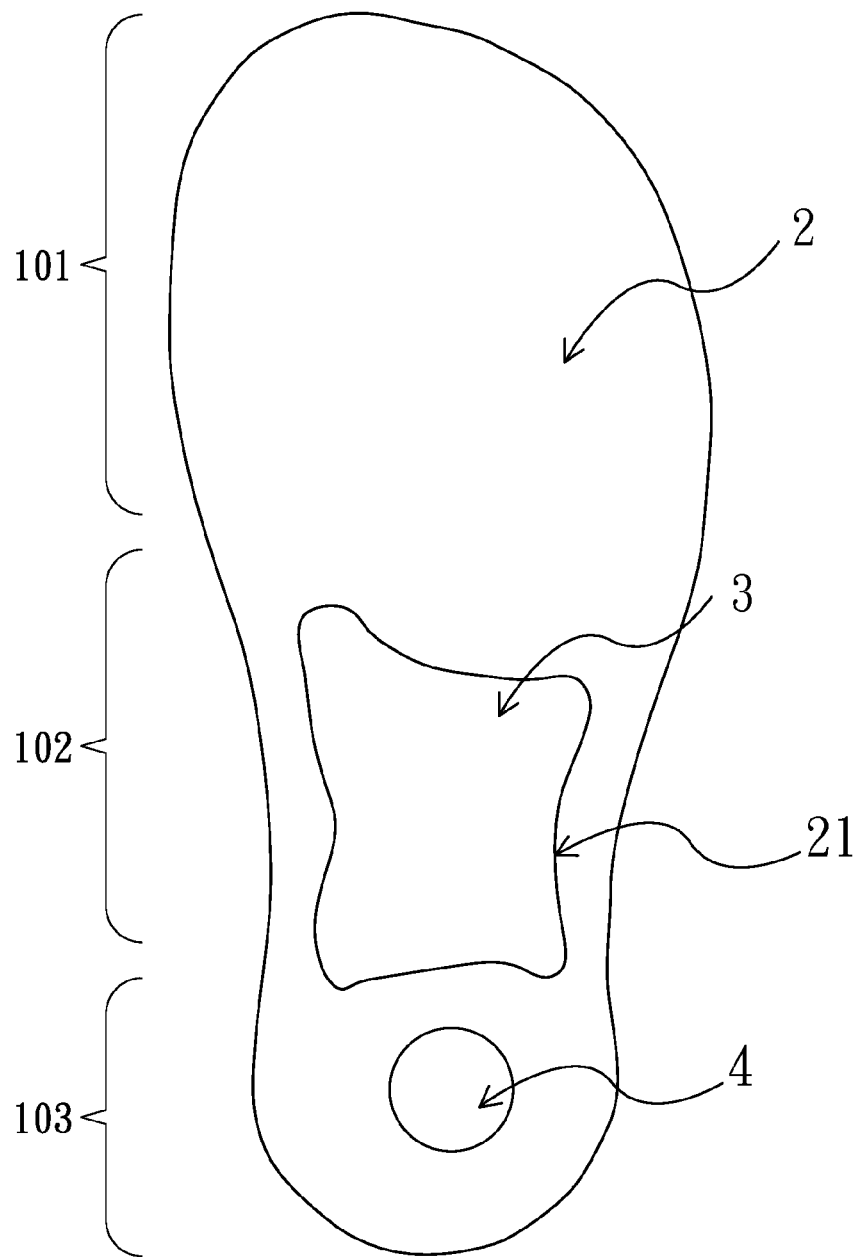
FIG. 4 is a bottom view of an embodiment practicing example of the antistatic insole.
Figure 5:
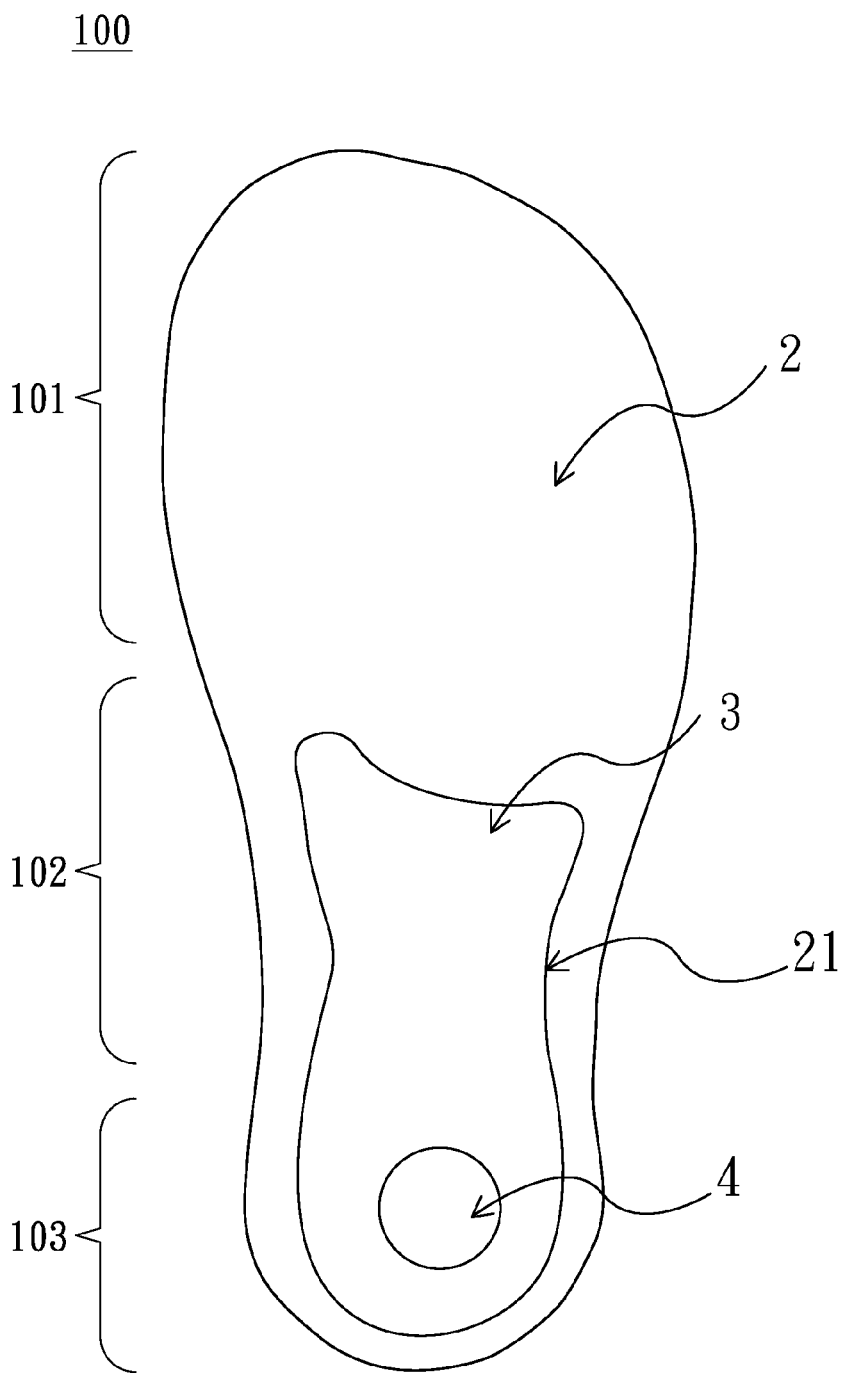
FIG. 5 is a bottom view of another embodiment practicing example of the antistatic insole.

In order to fully understand the goals, characteristics, and functions of this invention, the following practical examples are revealed with the figures to explain more specifically as follows. Firstly, please refer to the FIG. 1, FIG. 2, FIG. 3, FIG. 4, and FIG. 5. FIG. 1 is a top view of the embodiment practicing example of the antistatic insole. FIG. 2 is a profile view of I-I section of the FIG. 1. FIG. 3 is a profile view of II-II section of the FIG. 1. FIG. 4 is a bottom view of an embodiment practicing example of the antistatic insole. FIG. 5 is a bottom view of another embodiment practicing example of the antistatic insole. The figures show that this invention, an antistatic insole (100), includes one first layer body (1), one second layer body (2), one arch pad (3), one heel pad (4), and one cover layer (5).

The cover layer (5) is set on the surface of said first layer body (1). The second layer body is pasted on the bottom of the first layer body (1). The heel pad (4) and the arch pad (3) are installed in the notch (21) of bottom of said second layer body (2). The heel pad (4) installing in the second layer body (2) locates in the bottom of the heel area (103). The elasticity of said heel pad (4) is greater than that of said first layer body (1) and the stiffness of said arch pad (3) is greater than that of said first layer body (1). The first layer body (1) follows the contour of the foot arch of human body. The contour of the surface of said first layer body (1) acts coherently with that of said second layer body (2). Said cover layer (5), said first layer body (1), and said second layer body (2) are antistatic.

The antistatic insole (100) corresponds to the biomechanical properties of the forefoot area (101), the arch area (102), and the heel area (103) of human foot. Furthermore, said arch pad (3) is installed under said second layer body (2), and corresponds with said arch area (102). It provides different stiffness distributions to the antistatic insole (100) according to various types of foot arch to reach anti-fatigue and anti-static functions.

The cover layer (5) is made of an antibacterial conductive fabric with capillary phenomenon, which not only shows the antibacterial conductive function, but also has the characteristic of high abrasion, high softness, high sweat-absorbency, high breathability, elimination of odors, and good touching on foot. Said cover layer (5) consists of at least one of the materials as the following: carbon fiber, nickel coated graphite fiber, metal fiber, and intrinsic conductive polymer. The first layer body (1) is the high density foam made of polyurethane (PU) with good conductivity. Said first layer body (1) has to correspond with the contour of the second layer body (2) and to be combined closely in order to provide better support and comfort.

The second layer body (2) is made of rubber and conductive ethylene-vinyl acetate (EVA) copolymer. It has a notch (21) to accommodate said arch pad (3), and it includes second A layer body (2a) on forefoot area (101) and second B layer body (2b) locating on both arch area (102) and heel area (103). Said second A layer body (2a) is made of conductive EVA while said second B layer body (2b) is not, and they are mechanically combined as said second layer body (2).

The arch pad (3) is made of polyamide materials, among which are better to be Polyamide 6 or Polyamide 66. It corresponds to the contour of human foot followed by the data of experimental analysis, which statistically collects the data of the contour of human foot, and designs the contour of said arch pad (3) as different contours. In this example, said arch pad (3) is embedded on said second body layer (2) which corresponds to the notch (21) on the arch area (102) of said insole (100). In another example, said arch pad (3) is embedded on said second body layer (2) which corresponds to the notch (21) on the arch area (102) and heel area (103) of said insole (100). Said arch pad (3) and said heel area (103) are equipped with a hole (FIG. 5) to accommodate said heel pad (4) to be installed on said second body layer (2).

Said heel pad (4) whose material is urethane in high density foam is set up at heel area (103) for the purpose of providing heel area (103) a proper ability of shock absorption and relieving the fatigue after a long walk or standing for a long period.

Figure 6:
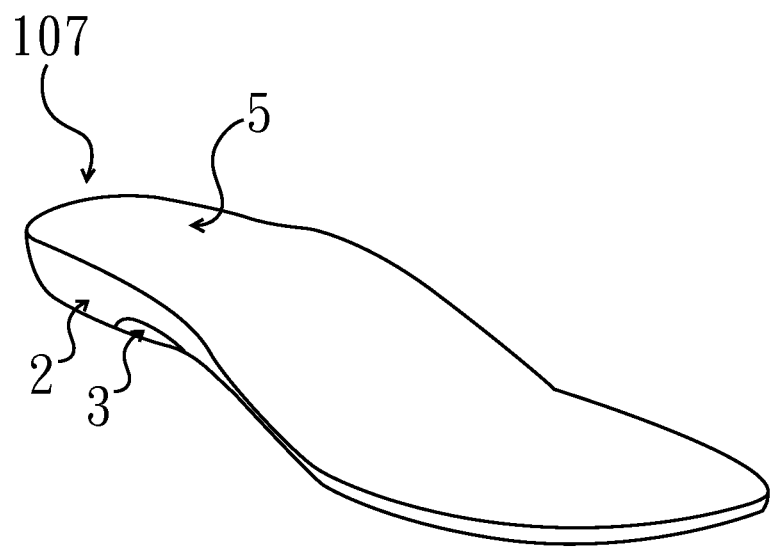
FIG. 6 is a three-dimensional diagram of the antistatic insole.

Please refer to FIG. 6, which is a three-dimensional diagram of the antistatic insole. It shows that this invention, an antistatic insole (100), forms a dustpan-shaped on the side edge (107) of the antistatic insole (100) from the arch area (102) to the heel area (103). Said side edge (107) makes said first layer body (1), said second layer body (2), and said arch pad (3) accompanied by the contour of human arch and heel to offset the side pressures in order to protect the ankle as well as to achieve the anti-fatigue character.

Figure 7:
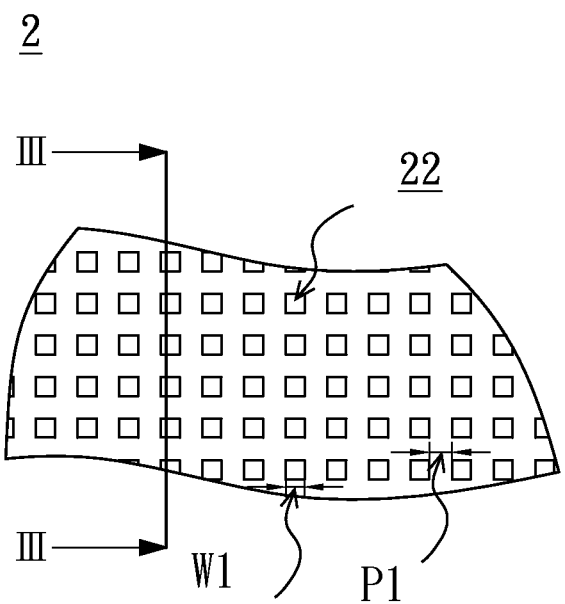
FIG. 7 is a top view showing a part of the second layer body.
Figure 8:
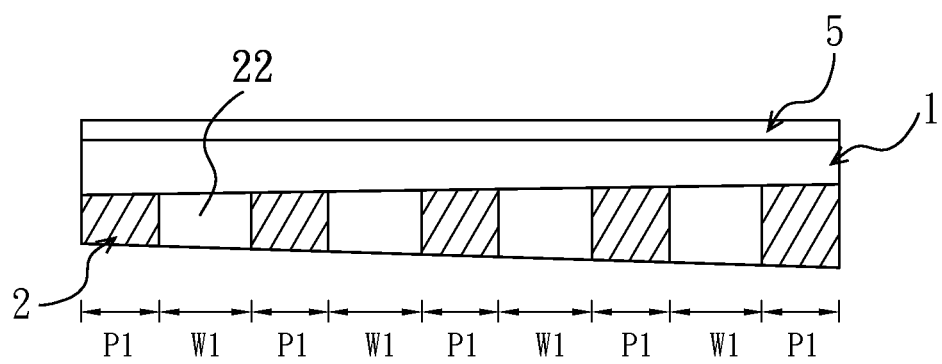
FIG. 8 is a profile view of III-III section of the FIG. 7.

Please refer to FIG. 7 and FIG. 8. FIG. 7 shows that a top view showing a part of the second layer body; and FIG. 8 shows that a profile view of III-III section of the FIG. 7. In the figures, the bottom of said second layer body (2) is equipped with a plurality of throughholes (22) which are arranged in array or irregular format. Moreover, the geometry (W1) of said plurality of throughholes (22) may be the same or different sizes, and so are the distances (P1) between said throughholes (22).

While the geometry (W1) of the throughholes (22) of said second layer body (2) becomes larger or the distances (P1) become smaller, said second layer body (2) becomes softer, and, that is to say, stiffness becomes smaller. On the contrary, while the geometry (W1) the throughholes (22) of said second layer body (2) decreases or the distances (P1) increase, said second layer body (2) becomes harder, or namely stiffness becomes larger.

The preferred embodiments of the present invention have been disclosed in the examples. However, the examples should not be constructed as a limitation on the actual applicable scope of the invention, and as such, all modifications and alterations without departing from the spirits of the invention and appended claims shall remain within the protected scope and claims of the invention.

What is claimed is:

1. An antistatic insole comprising:
a first layer body;
a second layer body pasted on the bottom of the first layer body;
an arch pad embedded in a notch of the second layer body;
a heel pad installed on the bottom of the second layer body locating in a heel area; and
a cover layer coving on the surface of said first layer body;
wherein the cover layer, the first layer body, and the second layer body are electrically conductive; wherein the extension of the first layer body and the second layer body forms a forefoot area, an arch area, and a heel area corresponding to human foot; the first layer body, the second layer body and the arch pad extend from the bottom of the human foot corresponding to a contour of an arch and heel of the human foot to form a generally trapezoid shape extended from the arch area to the heel area on a side edge of the antistatic insole; and wherein the second layer body is made of rubber and conductive ethylene-vinyl acetate (EVA) copolymer, and the second layer body has a notch in the arch area to accommodate an arch pad; and the second layer body comprises a second A layer body at the forefoot area and a second B layer body at the arch area and the heel area, and the second A layer body is made of the conductive EVA and the second B layer body is not made of the conductive EVA; and the second A layer body and the second B are mechanically connected to form the second layer body.

2. The antistatic insole according to claim 1, wherein elasticity of the heel pad is greater than elasticity of the first layer body and stiffness of the arch pad is greater than stiffness of the first layer body, a top surface of the first layer body corresponds to a contour of the arch of human foot, and the contour of the first layer body corresponds to the contour of a top surface of the second layer body.

3. The antistatic insole according to claim 1, wherein the cover layer is made of an antibacterial conductive capillary fabric, and comprises at least one of carbon fiber, nickel coated graphite fiber, metal fiber, and intrinsic conductive polymer.

4. The antistatic insole according to claim 1, wherein the first layer body is the high density foam made of conductive polyurethane (PU), and the first layer body corresponds to and combines closely to the second layer body.

5. The antistatic insole according to claim 1, wherein the arch pad is embedded in the notch at the arch area of the second layer body.

6. The antistatic insole according to claim 1, wherein the arch pad is embedded in the notch at the arch area and the heel area of the second layer body.

7. The antistatic insole according to claim 6, wherein the arch pad has a hole for receiving the heel pad therein in order to allow the heel pad to be installed on the second layer body.

8. The antistatic insole according to claim 1, wherein the arch pad is made of a polyamide material.

9. The antistatic insole according to claim 1, wherein the heel pad is disposed in the heel area and is made of urethane in high density foam.

10. The antistatic insole according to claim 1, wherein the second layer body has a plurality of through holes and the through holes are arranged in an array or an irregular format.

* * * * *